United States Patent
Morito

(10) Patent No.: US 6,782,190 B1
(45) Date of Patent: Aug. 24, 2004

(54) COPY PROTECTION APPARATUS AND METHOD

(75) Inventor: Hajime Morito, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/388,770

(22) Filed: Sep. 2, 1999

(30) Foreign Application Priority Data

Sep. 2, 1998  (EP) ............................................. 98307028

(51) Int. Cl.$^7$ ............................................. H04N 5/91
(52) U.S. Cl. ............................ 386/94; 360/60; 380/201
(58) Field of Search ............................ 386/94; 380/201, 380/203, 28, 30; 360/60; 705/57–58, 51, 54; 713/193; 358/403

(56) References Cited

U.S. PATENT DOCUMENTS

| | | | | |
|---|---|---|---|---|
| 5,323,244 A | * | 6/1994 | Yamaguchi et al. | 386/94 |
| 5,661,800 A | | 8/1997 | Nakashima et al. | |
| 5,761,301 A | | 6/1998 | Oshima et al. | |
| 5,987,607 A | * | 11/1999 | Tsumura | 380/203 |
| 6,131,162 A | * | 10/2000 | Yoshiura et al. | 380/28 |
| 6,282,654 B1 | * | 8/2001 | Ikeda et al. | 380/203 |
| 6,289,102 B1 | * | 9/2001 | Ueda et al. | 380/201 |
| 6,295,139 B1 | * | 9/2001 | Yamauchi et al. | 358/403 |
| 6,301,430 B1 | * | 10/2001 | Oguro et al. | 386/94 |

FOREIGN PATENT DOCUMENTS

| | | |
|---|---|---|
| EP | 553 545 A2 | 8/1993 |
| EP | 809 244 A2 | 11/1997 |

* cited by examiner

*Primary Examiner*—Thai Tran
*Assistant Examiner*—Christopher Onuaku
(74) *Attorney, Agent, or Firm*—Mattingly, Stanger & Malur, P.C.

(57) ABSTRACT

An apparatus and method of copy protection for use in digital data recorders such as DVD-RAM recorders (30), which includes using DVD disks (1) with unique serial numbers stored in a read only part (2) of the disk for recording data. The serial number of each disk together with other copy control information is digitally signed. The digital signature is verified at the DVD player/recorder (13, 30) to check whether the disk being played is an original disk or an authorized copy. If not, play back and recording of the data on the disk is prevented. The use of copy control information also allows the implementation of a copy generation management system.

23 Claims, 13 Drawing Sheets

COPY PROTECTION APPARATUS AND METHOD

BACKGROUND OF THE INVENTION

This invention relates to copy protection, particularly but not exclusively to an apparatus and method for protecting digital data on a data storage medium from unauthorised copying.

Although digital media such as audio CDs and CD-ROMs allow perfect reproduction of digital data stored on them, the problems of controlling unauthorised reproduction have so far been mitigated to some extent by the fact that these media have generally only been available in a read-only format, so that the potential infringer needed specialist recording and CD-pressing equipment to make high quality copies.

However, the introduction into the consumer market of recordable digital storage technology, including CD-R (Write Once) and CD-RW (Rewritable), as well as Digital Versatile Disk (DVD) technology, which aims to make low cost digital recorders widely available, has raised the need for sophisticated copy protection systems, to prevent extensive piracy. It is envisaged that DVD recorders, known as DVD-RAM recorders, will eventually replace the various different forms of currently available storage equipment, including computer hard-disk drives and video cassette recorders.

The principles of DVD technology are well established, with DVD-RAM recorders such as the Hitachi GF-1000 series available on the market. Reference is directed to "DVD Demystified", by Jim Taylor, published by McGraw-Hill, 1998, for further information on DVD principles.

Without any form of copy control, films, audio recordings and other digital content distributed on DVD disk or CD-ROM, can be easily recorded by a DVD-RAM, or other digital recorder, onto a digital data storage medium such as a recordable DVD disk, from which they can be further copied numerous times onto other DVD disks, without any degradation in the copy quality.

To prevent unauthorised copying, devices sold to consumers incorporate copy protection mechanisms. For example, copy protection information can be embedded in the data sector of a DVD disk, as illustrated in "DVD Demystified", by Jim Taylor at page 128. A possible method of copy control using such embedded information is for the digital content provider to supply the film or other digital content on a read-only medium, for example a DVD-ROM disk, with a "Never-Copy" flag embedded in the data. The DVD player/recorder will check for the presence of this flag and, if an attempt is made to copy the disk when the flag is present, the recording circuitry will prevent recording. However, this type of protection can be circumvented by using DVD-ROM/RAM drives as peripherals for computers, so as to enable copying of the data from an original disk onto a recordable disk on a bit-by-bit basis, including the copy protection information.

To prevent such bypassing of the protection scheme, some DVD players are designed to check for the presence of Never-Copy flags on recordable disks as opposed to ROM disks. The presence of such a flag on a recordable disk is taken to indicate that the disk is an unauthorised copy of an original ROM disk, so that playback of the data on the disk will be prevented. On the other hand, if the player detects that a ROM disk is being used, it will play back the data on the disk.

However, this scheme works on the premise that a computer user copying the disk will copy all of the data on a bit-by-bit basis, including the Never-Copy flag. The scheme can still be easily bypassed by the computer user who knows or determines where the copy control information is located on an original ROM disk, and who can therefore change or overwrite this information when making a copy of the original disk onto a recordable disk.

A further problem with the above described protection scheme is that it is inflexible, with no way of providing for a copy generation management system (CGMS), which governs the extent to which copying is permitted. For example, there is no way of providing for the contents of an original data storage medium to be copied to a back-up medium, while preventing the production of a further generation of copies from the back-up medium.

The present invention aims to address the above problems.

SUMMARY OF THE INVENTION

According to the present invention, there is provided apparatus for processing data stored on a storage medium which has a medium identifier, the apparatus including processing control means operable to control the processing of the stored data in dependence on the relationship between the medium identifier and verification information for the medium identifier stored on the medium, and in accordance with copy control data stored on the medium.

The processing control means can comprise recording control means for controlling the recording of said data from said medium in response to said copy control data.

The medium identifier may be a first medium identifier and the verification information can comprise a second medium identifier, so that the apparatus can prevent playback or recording if the first and second medium identifiers are different.

In the case of an original disk, the second medium identifier may be a copy of the first medium identifier.

The apparatus may include means for authenticating the verification information. The verification information may, for example, be digitally signed, and the authentication means may comprise means for verifying a digital signature.

According to the present invention, there is also provided data storage medium processing apparatus, said storage medium having a medium identifier, said apparatus comprising a playback module operable to control playback of data stored on said storage medium independence on the relationship between the medium identifier and verification information for the medium identifier stored on the medium, and a recording module operable to control the recording of data from said data storage medium on to a recordable storage medium in response to copy control data stored on said data storage medium.

The present invention further provides a method of processing data stored on a storage medium which has a medium identifier and verification information for the identifier stored on the medium, comprising controlling the processing of the stored data in dependence on the relationship between the medium identifier and the verification information, and controlling the recording of data from said medium in response to copy control data stored on the medium.

The present invention also provides recording apparatus for recording data onto a data storage medium having a medium identifier, comprising means for producing verification information for the medium identifier, said verification information to be stored on the medium, and means for controlling recording onto the medium in response to copy control data stored on a medium from which the data is being recorded.

The present invention additionally provides a method of recording data from a first data storage medium having a first medium identifier onto a second data storage medium having a second medium identifier, said first storage medium having copy control data stored thereon which indicates that said data may be copied at least once, comprising the steps of verifying from verification information stored on the first medium that said first medium is an original medium producing verification information for said second medium identifier and storing said information on said second medium.

According to the present invention, there is further provided a data storage medium comprising a medium identifier, verification information for the identifier stored on the medium and copy control data stored on the medium for use in controlling the copying of data from the medium.

Advantageously, in accordance with the invention, digital data on a data storage medium can be protected from unauthorised copying even if the copy protection information in the data is falsified. In addition, the protection scheme provides for the generation of legitimate copies, such as backup copies.

BRIEF DESCRIPTION OF THE DRAWINGS

Embodiments of the invention will now be described by way of example with reference to the accompanying drawings, in which.

DESCRIPTION OF THE PREFERRED EMBODIMENTS

Figure 1:
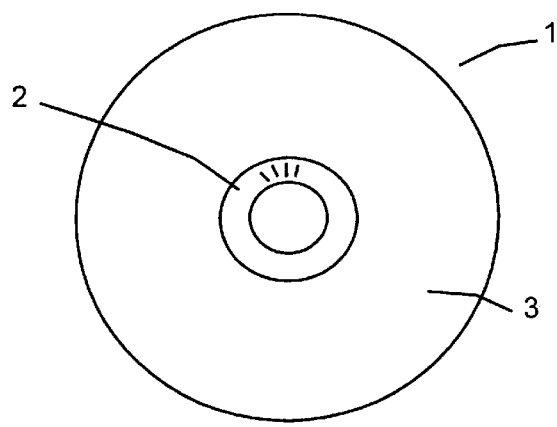
FIG. 1 is a schematic diagram of a DVD disk according to the invention.

Referring to FIG. 1, a DVD disk 1 according to the invention comprises an identification area 2 and a data area 3. The identification area is located on a read-only part of the disk, so that only the manufacturer of the disk can write information to this area during manufacture of the disk 1. For example, the identification area 2 can be the burst cutting area of a DVD disk, as further described in "DVD Demystified", by Jim Taylor, at pages 125–126.

Figure 2:
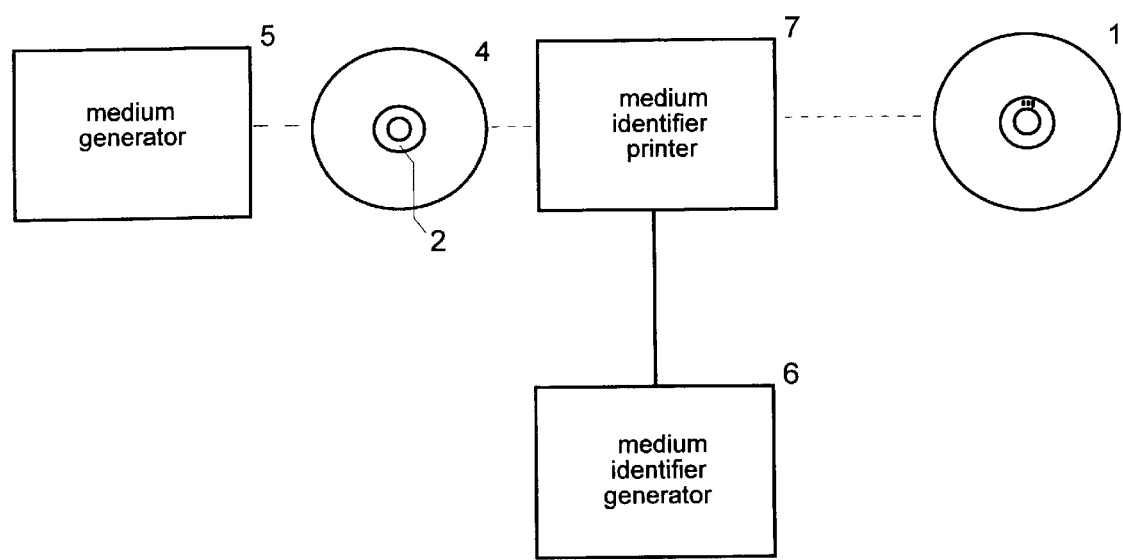
FIG. 2 is a schematic block diagram of apparatus used to manufacture the disk of FIG. 1.

Referring to FIG. 2, a blank DVD disk 4 is first produced by conventional manufacturing steps by a medium generator 5. DVD media manufacturing processes are similar to those used to produce CD-R and CD-RW disks. A medium identifier generator 6, for example a computer running serial number generation software, produces a unique identifier, for example, a serial number, which is written to the burst cutting area 2 of the blank DVD disk 4 by a medium identifier printer 7 so as to produce the blank DVD disk 1 ready for data recording. The medium identifier printer 7 is, for example, a laser configured to cut a series of bar-code like stripes in the burst cutting area 2 to represent the serial number. While, in practice, the identifier may well be unique, this is not an essential requirement, the criterion being that, to prevent extensive copying, it should be sufficiently unlikely that a consumer will be readily able to obtain disks having the same identification number.

The accessibility of the data area 3 of the DVD disk 1 depends on the type of disk involved. In the case of a DVD-ROM disk, this area is read-only. A DVD-ROM disk can be produced by stamping it from a master copy, as described in "DVD Demystified", by Jim Taylor, at pages 121–123. This is the most cost-effective process when producing a very large number of disks. Other manufacturing techniques for DVD-ROM disks enable the incorporation of unique data onto each individual disk.

In the case of a DVD-R (Write-Once) disk, the manufacturer produces a blank disk which includes, for example, a unique serial number in the identification area 2. The data area 3 is however available to be written to, once only, by the content provider, using conventional data writing apparatus. Once the content provider has written data to the disk, it essentially behaves as a DVD-ROM, and cannot be rewritten by the consumer.

Alternatively, the disk 1 may be a DVD-RAM (Rewritable) disk, typically distributed as a blank disk for recording and re-recording by consumers.

Figure 3:
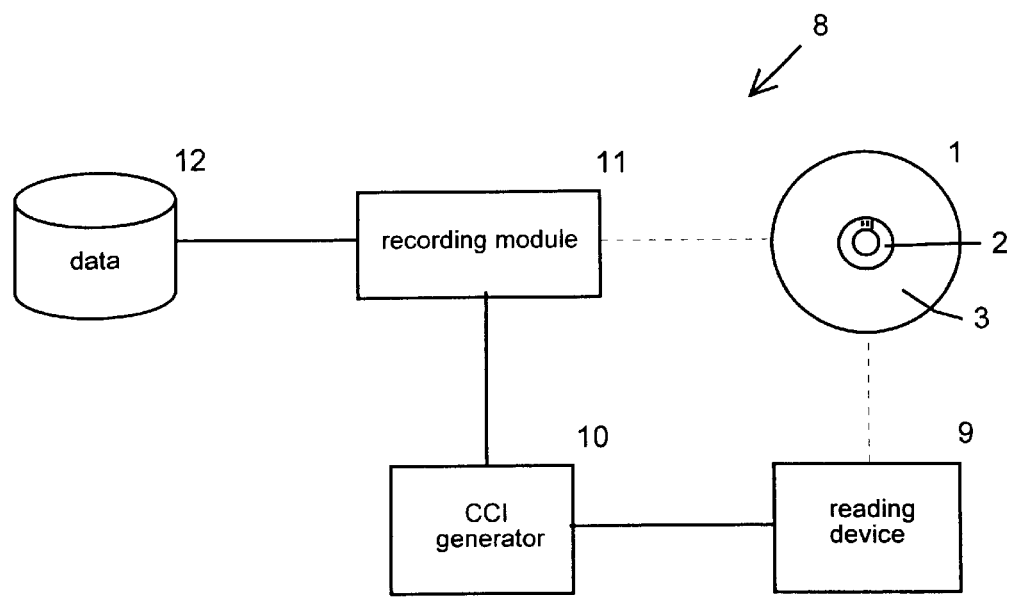
FIG. 3 is a schematic block diagram illustrating an example of the recording apparatus to be used by content providers to produce copy protected disks.

The principles behind the production of a pre-recorded disk for distribution to consumers are illustrated below by reference to a DVD-R disk 1, for example produced by the manufacturing arrangement illustrated in FIG. 2, as a result of which the content provider receives blank disks from the disk manufacturer, each having a unique disk identifier, for example, a serial number, written in the identification area 2 at the manufacturing stage. The content provider can then record a film, audio data or other digital content, generically referred to herein as data, and other relevant information to the disk 1, as explained by reference to the recording apparatus 8 illustrated in FIG. 3.

One example of the recording apparatus 8 to be used by the content provider comprises a reading device 9 for reading the disk identifier from the read-only part 2 of the DVD disk 1, a copy control information (CCI) generator 10 and a recording module 11 for recording the generated copy control information together with the data from a data archive 12 onto the disk 1.

Figure 4:
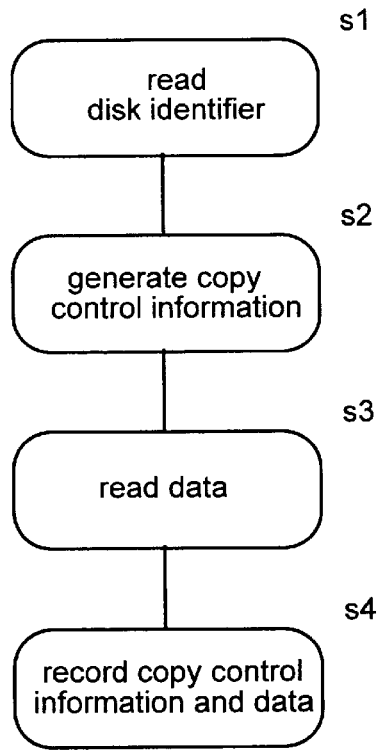
FIG. 4 is a flow diagram illustrating the operation of the recording apparatus of FIG. 3.

Referring to FIG. 4, which describes the operation of the recording apparatus 8, at step s1, the reading device 9 reads the disk identifier from the disk 1 being recorded and passes the identifier to the CCI generator 10, which produces verification information for the disk identifier in the form of copy control information (s2). At step s3, the recording module 11 reads the data from the data archive 12 and records this onto the disk 1 together with the copy control information from the CCI generator 10 (s4). The resulting pre-recorded disk 1 is referred to herein as the original disk.

Figure 5:
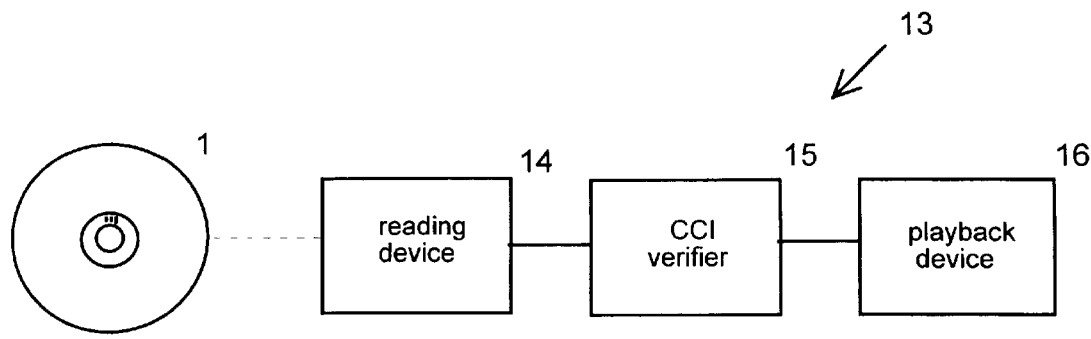
FIG. 5 is a schematic block diagram of a DVD player according to the invention.
Figure 6:
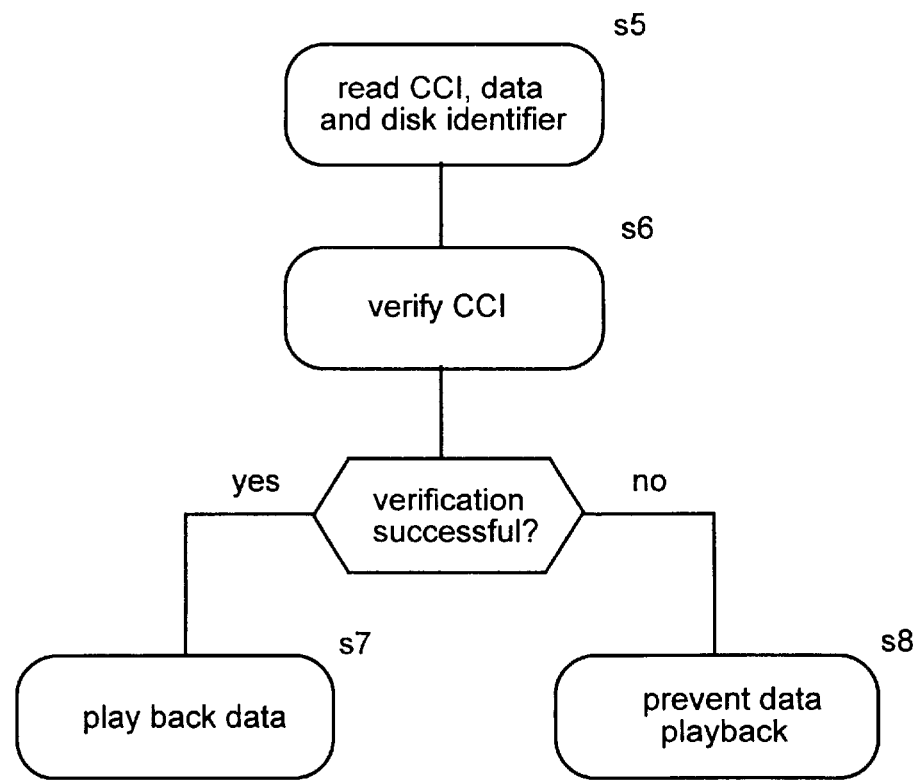
FIG. 6 is a flow diagram illustrating the operation of the player of FIG. 5.

Referring to FIG. 5, a DVD player 13 according to the invention comprises a reading device 14, a CCI verifier module 15 and a playback device 16. Referring to FIG. 6, which describes the operation of the player 13, at step s5, the reading device 14 reads the data, copy control information and the disk identifier from the disk 1 being played and sends this information to the CCI verifier module 15. At step s6, the verifier module 15 attempts to verify the copy control information, namely to determine from the copy control information and the disk identifier whether the disk being played is an original disk, an authorised copy or an unauthorised copy. If verification is successful, control passes to step s7 and the playback device 16 plays back the data. If verification is unsuccessful, control passes to step s8 and playback is prevented, since failure of the verification process is taken to mean that the disk being read is an unauthorised copy.

In all of the examples of the invention described herein, devices required to read and write data to DVD disks, such as the recording module 11, reading devices 9, 14 and the playback device 16, can be implemented by conventional circuitry as currently used in commercially available DVD player/recorders such as the Hitachi GF-1000 series. The functionality of the blocks required to implement the invention, such as the CCI generator 10 and CCI verifier 15 can be implemented in software on conventional microprocessor based circuitry.

Figure 7:
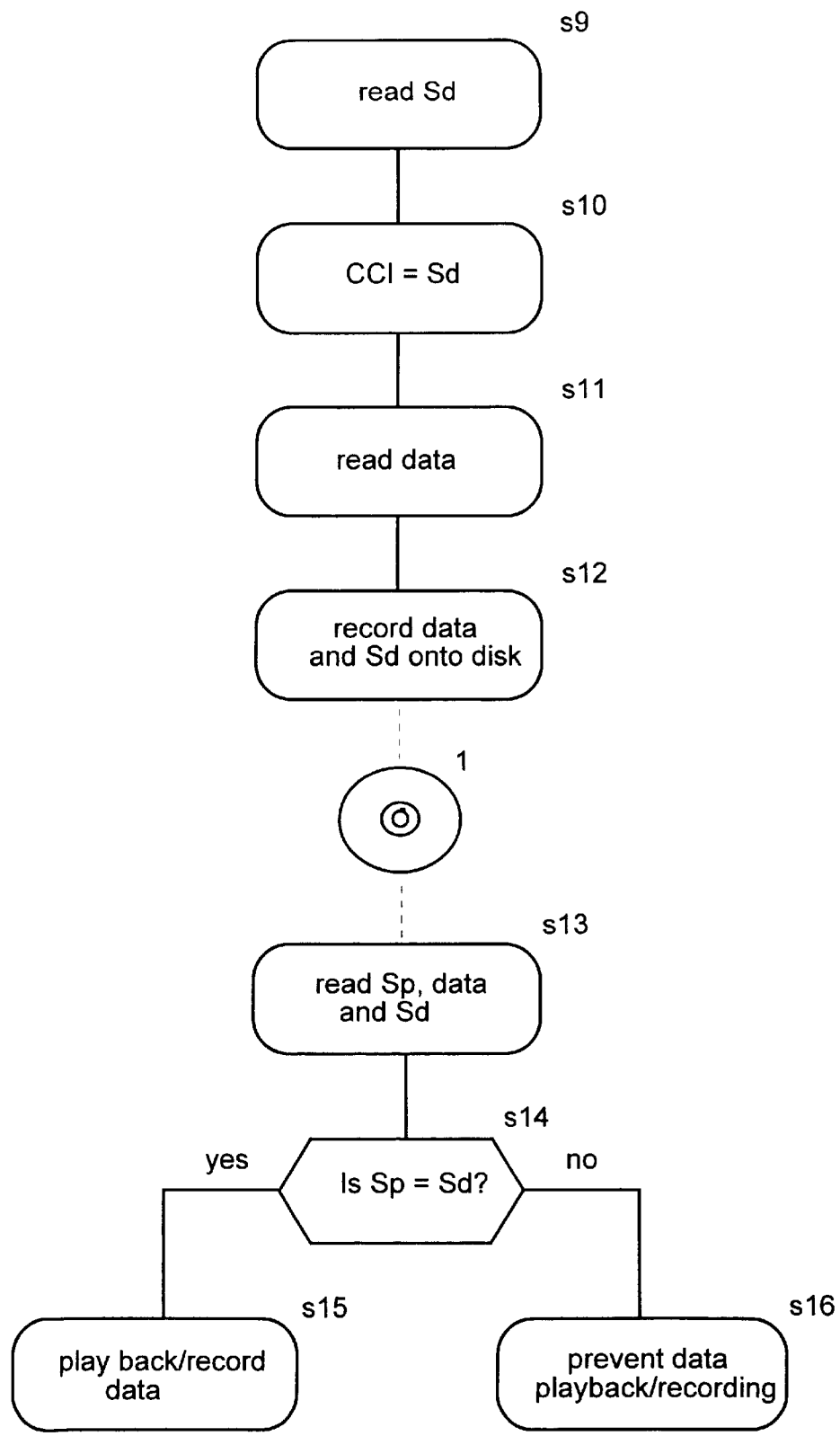
FIG. 7 is a flow diagram illustrating the detailed operation of the recording apparatus of FIG. 3 and player of FIG. 5 based on a given example of copy control information.

One example of the copy control information which can be recorded onto the disk 1 is simply a copy of the original disk identifier read by the reading device 9 in the recording apparatus 8. Referring to FIG. 7, at step s9, the reading device 9 reads a disk identifier $S_d$ from the original disk and at step s10 stores $S_d$ as the copy control information. At step s11 the recording module 11 reads data from the data archive 12 and then records the data and $S_d$ to the data area 3 of the disk 1 (s12). At step s13, the reading device 14 in the player 13 reads $S_p$, the disk identifier of the disk being played, from the burst cutting area 2 of the disk 1 and sends it to the CCI verifier 15. It also reads the copy control information, namely $S_d$, from the data area 3 of the disk 1. At step s14, the CCI verifier 15 compares the actual disk identifier $S_p$ with the copy of the original disk identifier $S_d$. If the original disk has not been copied, the two identifiers, for example the serial number of each disk, will be identical and a signal will be sent to the playback device 16 (s15) indicating that the disk can be played. On the other hand, if the original disk has been copied, so that all the data on it has been transferred to a new disk, then the disk identifier $S_p$ in the burst cutting area 2 of the new disk will be different from the original disk identifier $S_d$ copied over to the data area 3 of the new disk. In this case, a signal is sent to the playback device 16 (s16) that the disk is an unauthorised copy and therefore cannot be played.

The use of a copy of the original disk identifier as the copy control information provides a form of playback copy control similar to the use of a Never-Copy flag as described above. Therefore, while the making of a copy of an original disk is not itself prevented, a DVD player according to this example will not play back the data on the copy. Furthermore, the making of a second generation of copies from the copied disk can itself be prevented by a recording device which provides the same verification check as the player 13, as illustrated at steps s14 to s16. This works because the recording device recognises a first generation copy as one in which $S_p \neq S_d$ and so can prevent further recording.

To prevent a consumer from bypassing the protection provided by the copy control method described above, it is envisaged that the copy control information should itself be protected against access and alteration.

An example of a suitable form of protection is the use of a digital signature, which can be based on a public key cryptographic system. Methods of forming digital signatures are well known and digital signature software is commercially available, for example from RSA Data Security Inc, California, USA, which uses the well-known RSA public-key algorithm. The principles of public key systems and their use in digital signatures are set out below. For a more detailed description, reference is directed to Bruce Schneier, "Applied Cryptography", John Wiley & Sons, Inc. 1996, ISBN 0-471-11709-9.

Public key encryption is based on the use of an asymmetric pair of mutually inverse mathematical operations known as a key pair.

For example, assuming that E is a public key algorithm, then the notation $E_K(m)$ signifies the encryption of a message m using a key K.

If K and $K^{-1}$ are key pairs for E, then $E_K(E_K-1(m))=m$. So a message encrypted with a key $K^{-1}$, referred to herein as the private key, can be decrypted by applying the key K, referred to herein as the public key. Public key cryptography is based on the fact that it is currently not computationally feasible to calculate one part of the key pair from the other part if the bit length of the key is large enough, for example 512 bits or larger.

A digital signature can be based on a public key algorithm and a one way hash function. A hash function is any function which takes a variable-length input string and converts it to a fixed-length and generally smaller output string known as the hash value. A one way hash function is a function for which, given a message m, it is easy to calculate a hash value c=H(m), but for which it is difficult to calculate m, starting from a given hash value c. It is generally computationally unfeasible to calculate m from c if the output bit length of H is large enough, for example 128 bits or larger. Reference is further directed to Bruce Schneier, "Applied Cryptography", pages 29 to 31 and 38 to 39, and to D. W. Davies and W. L. Price, "The Application of Digital Signatures Based on Public-Key Cryptosystems", Proceedings of the Fifth International Computer Communications Conference, October 1980, pp. 525–530 and National Physical Laboratory Report DNACS 39/80, December 1980.

The way in which a digital signature can be used is illustrated below.

For example, X wishes to send a message to Y. We assume that the content of the message is not secret, but that Y wishes to be sure that the message originated from X and that it is unaltered by any third party. Therefore, X generates key pairs K and $K^{-1}$ for public key algorithm E. X keeps the private key $K^{-1}$ secret and opens key K to the public. Then X generates the message m and signs it digitally, by:

1. calculating c=H(m), where H is a known hash function
2. encrypting c by E using private key $K^{-1}$ ie. digital signature=$E_K$–1(c)

The digital signature is referred to herein as $Sig_K$–1(m), so that the above equation can be written as $Sig_K$–1(m)=$E_K$–1(c)

When Y receives the message m, he can verify the digital signature using X's public key K, by:

1. calculating c'=H(m)
2. decrypting $E_K$–1(c) using key K to obtain c, ie. c=$E_K$($E_K$–1(c))
3. comparing c and c'

If c=c', the verification succeeds, otherwise it fails.

The verification will fail if the message m has been changed in any way, since in that case the hash of the message c' will change. Alternatively, the verification will fail if the digital signature has been falsified. Since X is the only person who has access to the private key $K^{-1}$, X is the only person capable of generating the correct digital signature which can be verified by the public key K.

Referring again to FIG. 3, to apply the above described form of protection in the simple case outlined above of using a copy of the original disk identifier to verify the authenticity of a disk being played, the CCI generator 10 in the recording apparatus 8 includes an input from a key pair generator which generates a key pair K, $K^{-1}$. Key pair generator software, including generators for specific algorithms such as the DSA and RSA algorithms, is widely available commercially, and can, for example, be implemented in the Java™ programming language. The Java™ API, for example, includes a key pair generator class known as java.security.KeyPairGenerator. A disk identifier $S_d$, where $S_d$ represents the disk identifier of the original disk, is read from the disk 1 by the reading device 9 and a digital signature $Sig_K$–1($S_d$) is formed using the private key $K^{-1}$ and a suitable one-way hash function H(x) which is fixed at both the recording apparatus and the player.

An example of a suitable hash function is the Secure Hash Algorithm (SHA) described at pages 442–445, "Applied Cryptography", referred to above. This algorithm accepts a variable length input bit stream and outputs a 160 bit hash. Typically, knowledge of the hash function decided on will be limited to the recording apparatus/player equipment vendors on the basis of a non-disclosure agreement. The digital signature $Sig_K$–1($S_d$) is recorded onto the disk 1 by the recording module 11 together with the public key K.

Referring again to FIG. 5, at the player 13, the reading device 14 reads the public key K and $Sig_K$–1($S_d$) from the data area 3 and the disk identifier $S_p$ from the identifier area 2 of the disk 1 being played. The CCI verifier 15 calculates the hash value H($S_p$) and uses K to decrypt $Sig_K$–1($S_d$) so as to obtain the hash value H($S_d$). It then compares these two hash values. If $S_d$ and $S_p$ are identical, because the disk being played is the original disk, then the hash values are also identical, then verification is successful and a signal is sent to the playback device 16 permitting playback. If $S_d$ and $S_p$ are not identical, because the disk being played is a copy of the original disk, then their hash values will be different, so that the verification process fails, which triggers a signal to the playback device 16 to prevent playback. Since the content provider is the only one to have access to the private key $K^{-1}$, it is the only one that can correctly encrypt the serial number or other identifier of the original disk.

To permit more complex control over copying, further information can be included as part of the copy control information, for example, a copy control field which is capable of implementing copy generation management.

Figure 8:
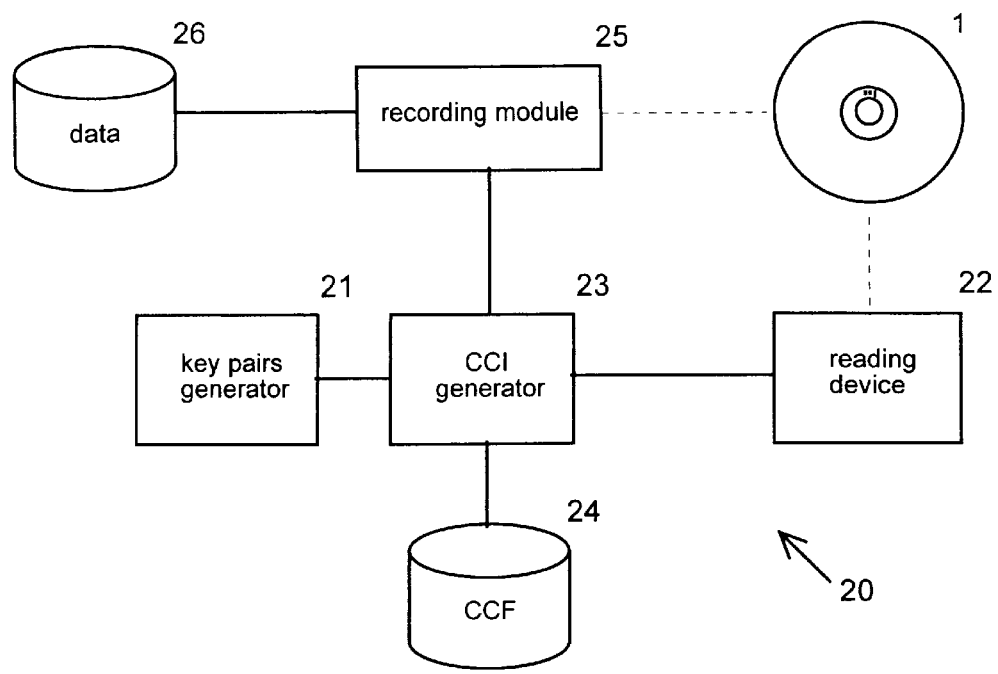
FIG. 8 is a schematic block diagram of recording apparatus to be used by content providers according to a further example of the invention.
Figure 9:
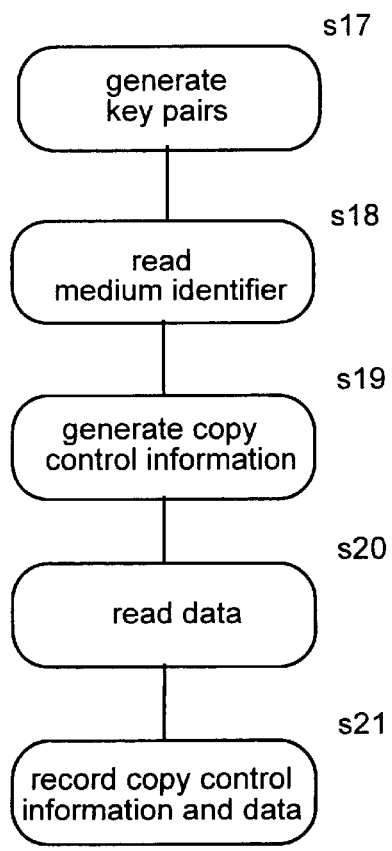
FIG. 9 is a flow diagram illustrating the operation of the recording apparatus of FIG. 8.

FIGS. 8 and 9 explain the general structure of another example of a recording apparatus 20 for use by a content provider and the steps involved in the production of a pre-recorded copy protected disk.

At step s17, a key pairs generator module 21 generates key pairs of the public algorithm for signature verification. At step s18, a reading device 22 reads the identifier of the DVD disk 1, for example a serial number, from the read-only part 2 of the disk 1. At step s19, a copy control information (CCI) generator 23 produces copy control information including a digital signature on the basis of the keys, identifier and a copy control field from a copy control field (CCF) database 24. The copy control field can take one of at least four values, including Copy-Freely, Never-Copy, Copy-Once and No-More-Copy. The actual information which goes to make up the copy control information will be explained in more detail below. At step s20, a recording module 25 reads the data to be written to the DVD disk 1 from a data archive 26 and at step s21, writes the data and the copy control information from the CCI generator 23 to the DVD disk 1 to produce the finished copy protected pre-recorded DVD disk.

The general structure and functionality of a DVD player has already been described by reference to FIGS. 5 and 6.

Figure 10:
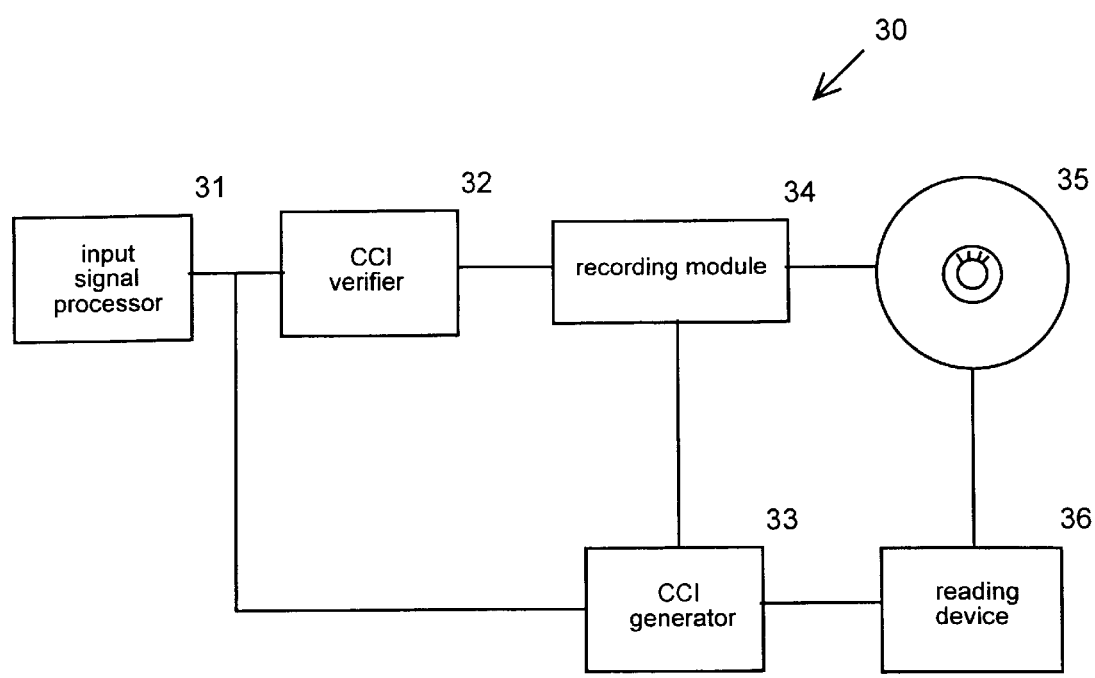
FIG. 10 is a schematic block diagram of a data recording device according to the invention to be used in a consumer device.
Figure 11:
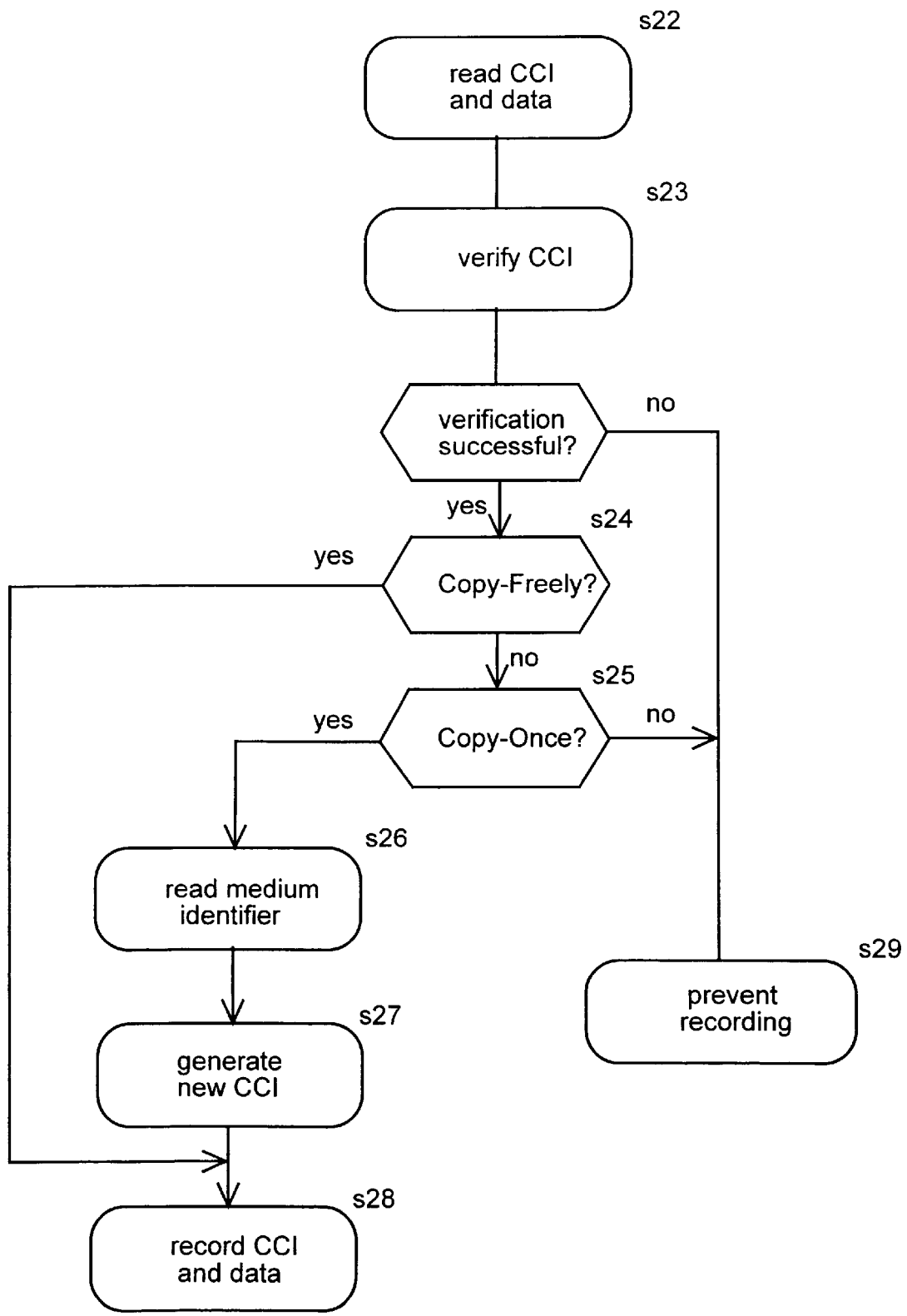
FIG. 11 is a flow diagram illustrating the operation of the recording apparatus of FIG. 10.

FIG. 10 illustrates the structure of a recording device 30 in accordance with the invention for use by consumers to record data onto recordable disks. Referring to FIGS. 10 and 11, at step s22, the input signal processor module 31 receives copy control information and data to be recorded from a disk player 13 as described above, and sends them to a CCI verifier module 32 and a CCI generator 33. At step s23, the CCI verifier 32 attempts to verify the copy control information. The CCI verifier 32 performs the same verification function as the CCI verifier 15 in the player 13, and if the player and recording device are implemented as a single unit, the verifier 32 is implemented by the same circuitry or by the same software function. If, however, the recording device 30 is a separate unit from the player 13, the CCI verifier 32 is implemented as a double checking facility and to provide a verification function for a player which may not include copy protection facilities.

If verification fails at this stage (s23), control passes to step s29, and recording of the data onto a new disk is prevented. If verification succeeds, then control passes to step s24, at which the CCI verifier 32 determines if the copy control field indicates that the data can be freely copied, for example, because of the presence of a Copy-Freely flag. If the data can be freely copied, control passes to step s28, at which the recording module 34 records the copy control information and the data to a new disk 35. If, at step s24, the copy control information indicates that data cannot be freely copied, control passes to step s25, at which the CCI verifier 32 determines if the copy control field indicates that the data can be copied only once, for example, because of the presence of a Copy-Once flag. If the flag is not a Copy-Once flag, the conclusion is that a Never-Copy or No-More-Copy flag is set, and control also passes to step s29 where recording is prevented. If, on the other hand, at step s25, the copy control information indicates that the Copy-Once flag is set, control passes to step s26, at which the reading device 36 reads the medium identifier of the new disk 35 from the read-only part of that disk and sends this identifier to the CCI generator 33. At step s27, the CCI generator changes the copy control field from Copy-Once to Copy-No-More and generates new copy control information to be recorded onto the disk 35 by the recording module 34. The nature of the new copy control information is explained in detail below.

The precise nature of the copy control information which is written to an original disk depends on the level of protection which a content provider wishes to achieve.

For example, the provider may decide that the content of, for example, its DVD-audio disk can never be copied. On the other hand, the provider may wish to provide its customers with the ability to make a back-up copy of the original, but not to produce further copies. The way in which these goals can be achieved is explained below using the following notation:

ID is information identifying the content provider. This can include the provider's name, the name of the content, its date of production and so on. CCF represents the copy control field, which can take the values Copy-Freely, Never-Copy, Copy-Once and No-More-Copy, as explained above. A and A' are used as convenient notation to group the provider dependent information ID and CCF together, for example, by concatenation, such that A=ID|CCF and A'=ID|CCF', where CCF' represents a change in the value of the copy control field when recording onto a new disk. $S_d, S_c$ and $S_p$ are disk identifiers printed on the read-only part of the disk. They cannot therefore be changed by the consumer. $S_d$ represents the disk identifier of the original disk, $S_c$ represents the disk identifier of the disk to which the original disk can be legitimately copied and $S_p$ represents the disk identifier of the disk being played. It will be understood that $S_p$ can take the values of $S_d$ and $S_c$ where, respectively, the original disk and a legitimate copy of the original disk, are being played. $K_A$ and $K_A-1$ are key pairs for the digital signature of the content provider. $K_M$ and $K_M-1$ are key pairs for the digital signature required to implement the CGMS scheme, for example to ensure that a copy is only made from the original and not from a copy of the original.

Figure 12:
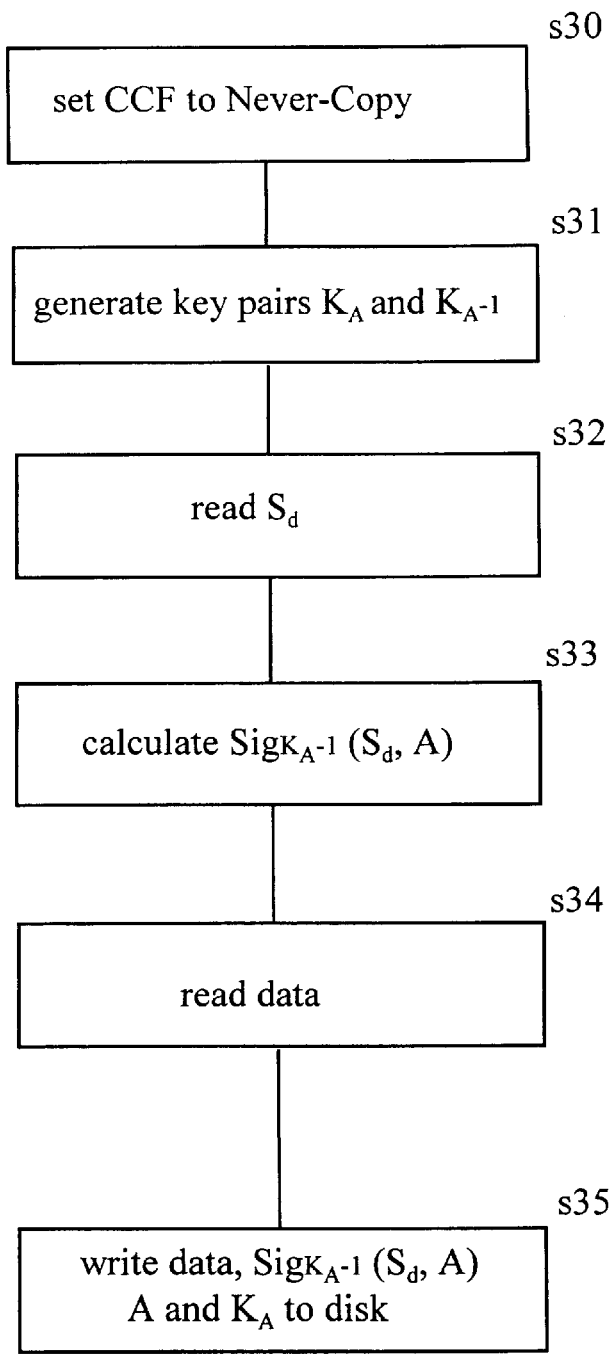
FIG. 12 is a flow diagram illustrating the detailed operation of the recording apparatus of FIG. 8 for the case where copying of an original disk is not permitted.

Referring to FIGS. 8 and 12, in the case where a content provider wishes to prohibit all copying from the original disk, including the making of a backup copy, at step s30, the CCF flag is set to Never-Copy. At step s31, the key pairs generator module 21 generates key pairs $K_A$ and $K_A-1$, as described above for the first example. The reading device 22 then reads $S_d$ from the read-only part of the disk 1 (s32) and the CCI generator 23 calculates the digital signature $SigK_A-1$ ($S_d$, A) at step s33. The copy control information in this case comprises $SigK_A-1$ ($S_d$, A), A and $K_A$.

The recording module 25 then reads data from the data archive 26 (s34) and at step s35 writes the data to the disk 1 together with the copy control information from the CCI generator 23.

Figure 13:
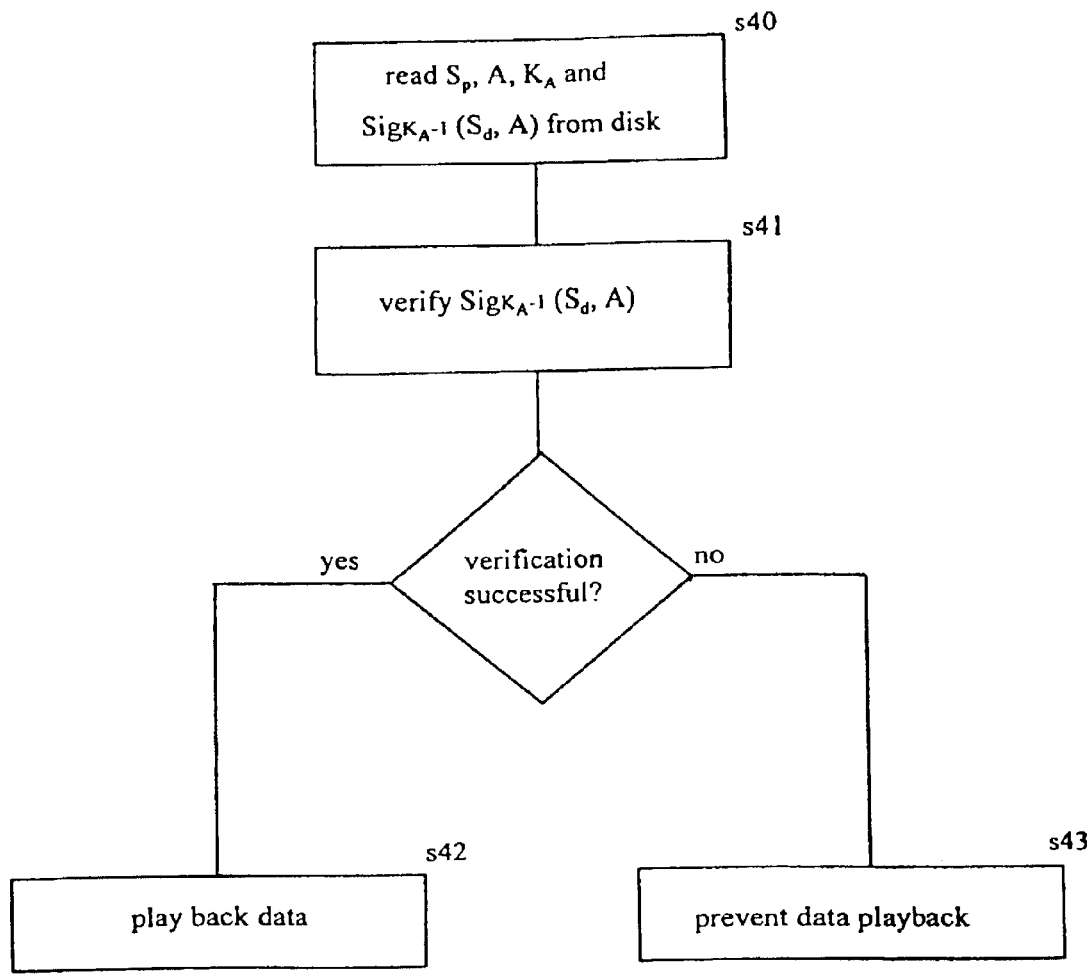
FIG. 13 is a flow diagram illustrating the detailed operation of the player of FIG. 5 where the disk being played is recorded in accordance with the recording operation illustrated in FIG. 12.

Referring to FIGS. 5 and 13, when a DVD disk 1 encoded with the above data is inserted into a DVD player 13, at step s40 the reading device 14 reads $S_p$ from the read-only part 2 of the disk 1. It also reads the copy control information, namely A, $K_A$ and $SigK_A-1$ ($S_d$, A), from the data area 3. The CCI verifier 15 then verifies the digital signature $SigK_A-1$ ($S_d$, A) using $S_d$, A and $K_A$ at step s41. If the verification succeeds, control passes to step s42 and the data is played back. Otherwise, control passes to step s43, where playback of data is prevented. To further explain the operation of this example, the verification process is explained in detail below.

Knowing $S_p$ read from the identification area 2 of the disk and A read from the data area 3 of the disk 1, it is possible to calculate a function c' using a one-way hash function H, such that c'=H(m), where m=($S_p$, A). Therefore, c'=H($S_p$, A).

The function H is the same function as was used at the recording apparatus 20 to produce a function c=H($S_d$, A). This function is obtained by decrypting $SigK_A-1$ ($S_d$, A) using the public key $K_A$ read from the data area 3 of the disk 1.

If c=c', ie. H($S_d$,A)=H($S_p$, A), this verifies that both A and $S_p$ are unchanged from the time of recording, and in particular that $S_p$=$S_d$, namely that the serial number on the disk being played is identical to the serial number of the disk on which the data was recorded. On the assumption that the serial numbers are unique, this means that the disk being played is the original disk and so playback of the data it contains is permitted. If the verification fails, the disk being played is assumed to be a copy and playback is therefore prevented.

Figure 14:
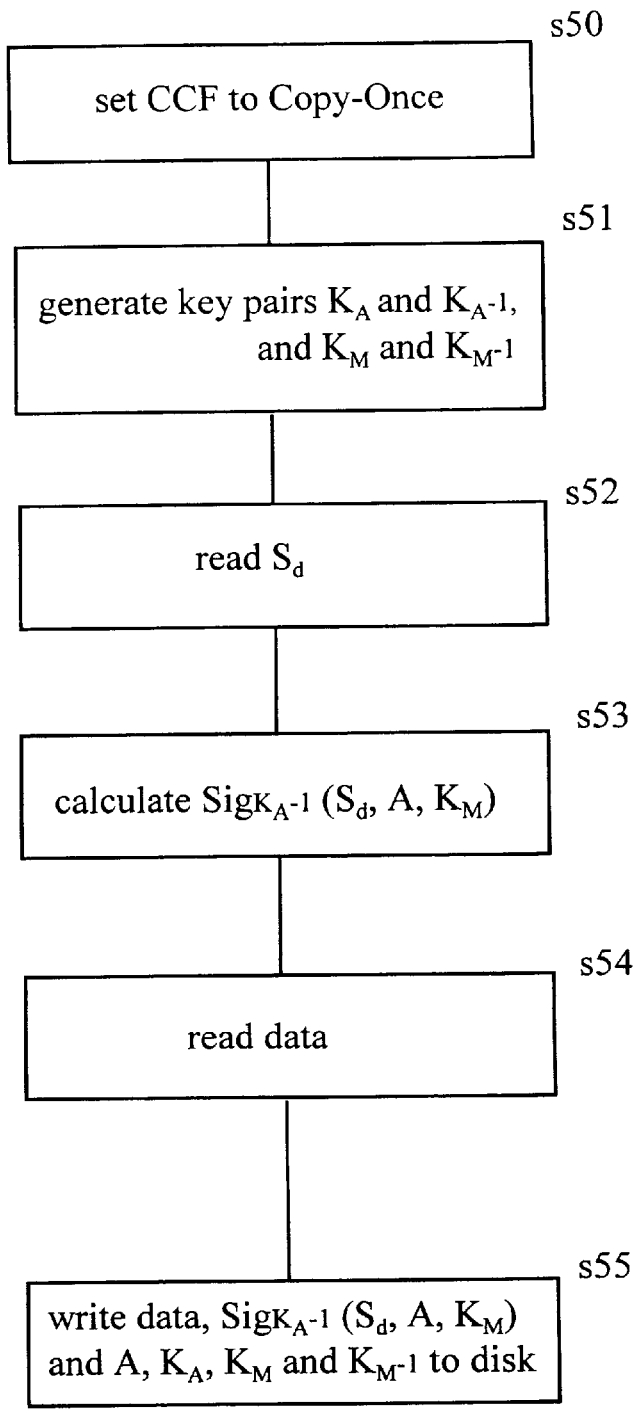
FIG. 14 is a flow diagram illustrating the detailed operation of the recording apparatus of FIG. 8 for the case where one generation of copies from an original disk is permitted.

Referring to FIGS. 8 and 14, in the case where a content provider wishes to provide the facility for the making of a backup copy from the original disk only, step s50 is to set the Copy Control Field to Copy-Once. At step s51, the key pairs generator module 21 generates key pairs $K_A$ and $K_A^{-1}$, as well as $K_M$ and $K_M^{-1}$. The reading device 22 then reads $S_d$ from the read-only part of the disk 1 (s52) and the CCI generator 23 calculates the digital signature $SigK_A-1$ ($S_d$, A, $K_M$) at step s53. The recording module 25 then reads data from the data archive 26 (s54) and at step s55 writes the data to the disk 1 together with the copy control information from the CCI generator 23, which comprises A, $K_A$ $K_M$, $K_M^{-1}$ and $SigK_A-1$ ($S_d$, A, $K_M$).

Figure 15:
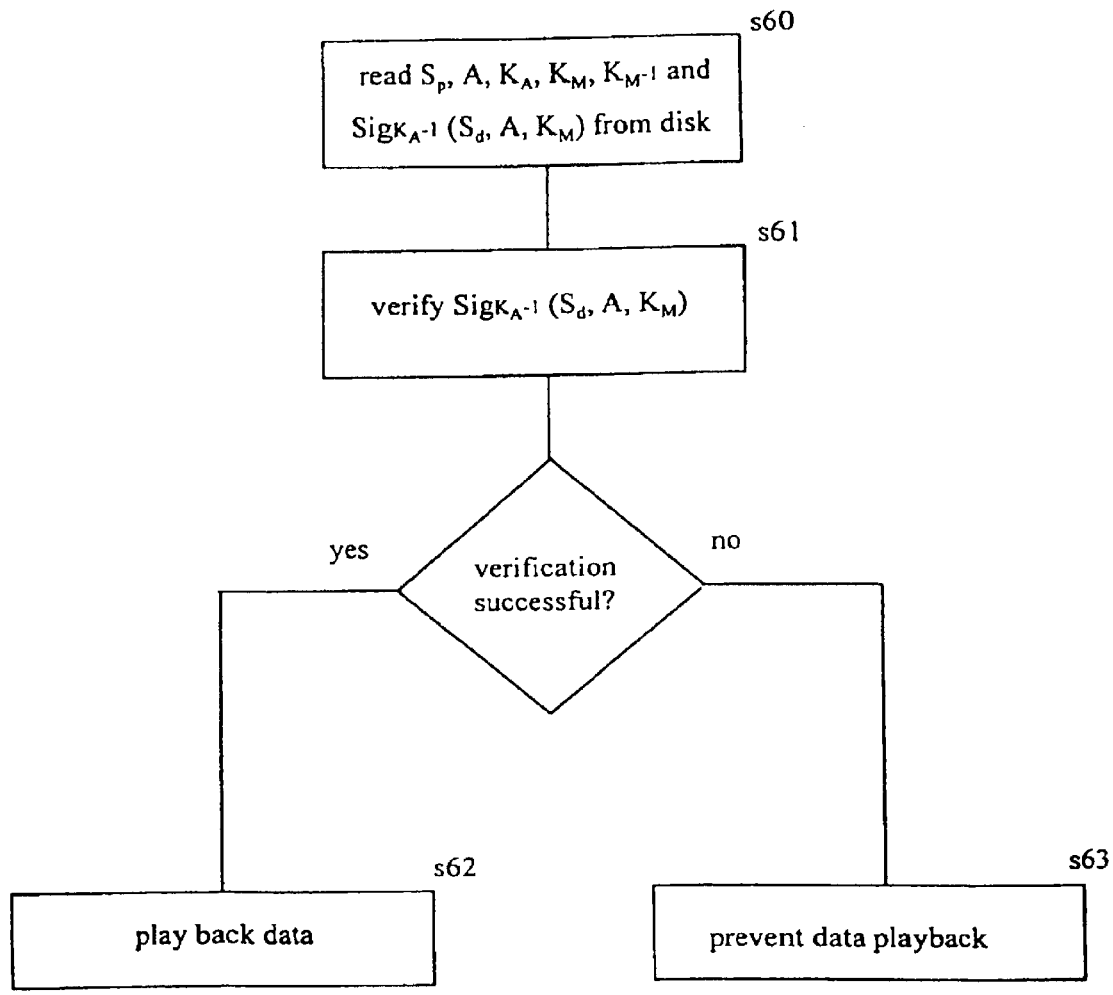
FIG. 15 is a flow diagram illustrating the detailed operation of the player of FIG. 5 where the disk being played is recorded in accordance with the recording operation illustrated in FIG. 14.

Referring to FIGS. 5 and 15, when a DVD disk 1, encoded with the above data, is inserted into a DVD player 13, at step s60, the reading device 14 reads $S_p$ from the read-only part 2 of the disk 1. It also reads the copy control information, namely A, $K_A$, $K_M$, $K_M^{-1}$ and $SigK_A-1$ ($S_d$, A, $K_M$) from the data area 3 of the disk 1. The CCI verifier module 15 then verifies the digital signature $SigK_A-1$ ($S_d$, A, $K_M$) using $S_d$, A, $K_M$ and $K_A$ (step s61) as explained in detail above. If the verification succeeds, control passes to step s62 and the data is played back. Otherwise, control passes to step s63, where playback of data is prevented.

Figure 16:
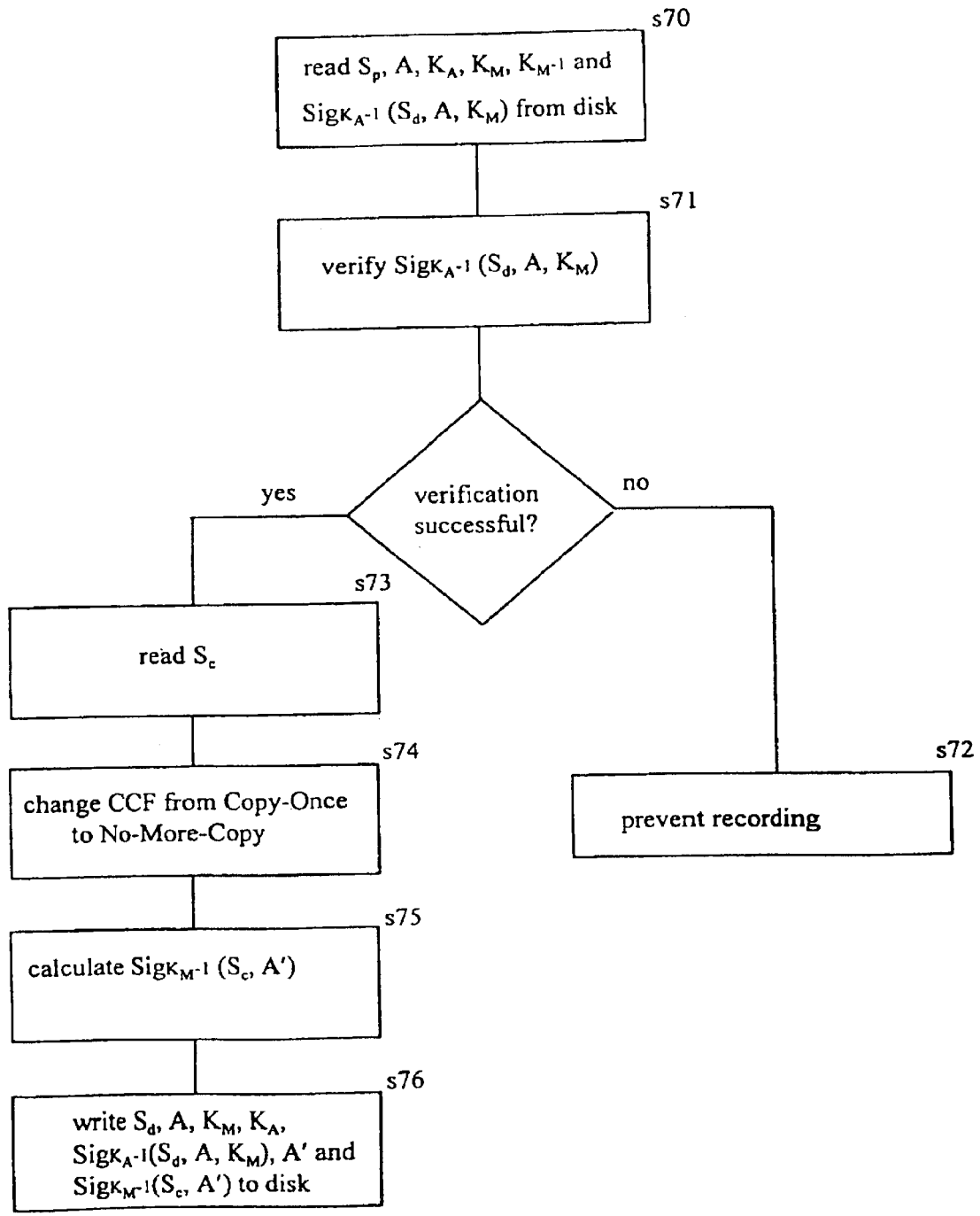
FIG. 16 is a flow diagram illustrating the detailed operation of the recording device of FIG. 10 for the case where the data being recorded was itself recorded in accordance with the recording operation illustrated in FIG. 14.

Since it is permitted to make a backup copy of the original disk, the detailed operation of the recording device 30 shown in FIG. 10, is set out in the flowchart of FIG. 16. Referring also to FIGS. 10 and 15, steps s70 and s71 are identical to steps s60 and s61 as carried out by the playback device. If the verification procedure fails, all further processing is stopped at step s72. The purpose of including $K_M$ in the verification procedure is to ensure that $K_M$ has not been falsified, since both parts of the key pair $K_M$ and $K_M-1$ are included, and therefore available to a potential infringer, on the original disk. If the verification procedure succeeds, then at step s73, the reading device 36 reads $S_c$ from the read-only part of the destination disk 35. The CCI generator 33 changes the copy control field of A from Copy-Once to No-More-Copy and stores it as A' (s74). It then calculates the digital signature $\text{Sig}_{KM}-1(S_c, A')$ (s75) and at step s76 writes $S_d$, A, $K_M$, $K_A$, $\text{SigK}_A-1(S_d, A, K_M)$, A' and $\text{Sig}_{KM}-1(S_c, A')$ to the data area 3 of the destination disk 35.

Figure 17:
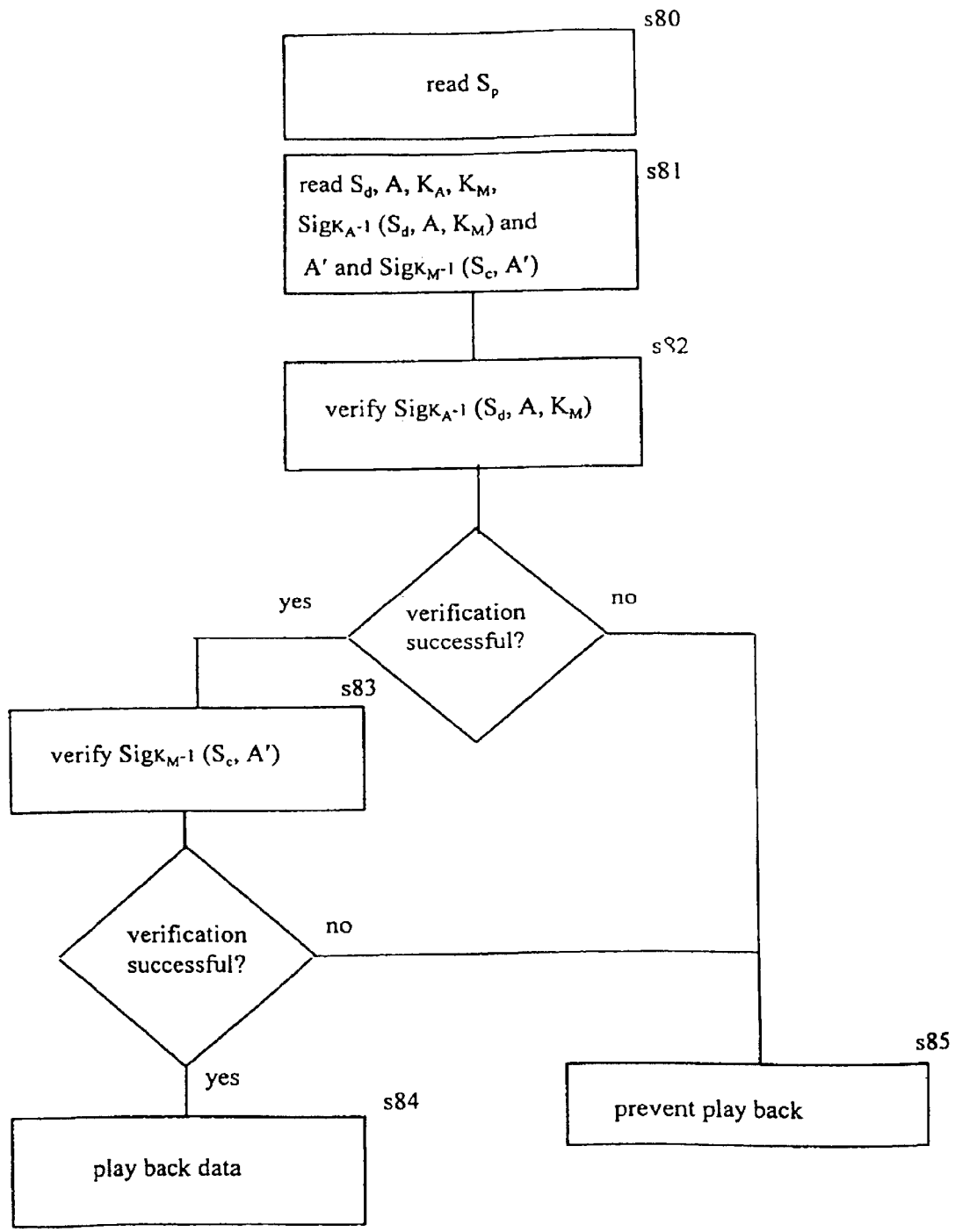
FIG. 17 is a flow diagram illustrating the detailed operation of the player of FIG. 5 where the disk being played is recorded in accordance with the recording operation illustrated in FIG. 16.

Referring to FIGS. 5 and 17, to play back data from a disk which is marked with a No-More-Copy flag, at step s80 the reading device 14 reads $S_p$ from the read-only part 2 of the disk 35. It also reads the copy control information, namely $S_d$, A, $K_M$, $K_A$, $\text{SigK}_A-1(S_d, A, K_M)$, A' and $\text{Sig}_{KM}-1(S_c, A')$ from the data area 3 of the disk (s81). The CCI verifier 15 then verifies the digital signature $\text{SigK}_A-1(S_d, A, K_M)$ using $S_d$, A, $K_M$(s82). This step verifies that the key $K_M$ used in the second part of the verification process has not itself been falsified. If verification fails, playback is stopped (step s85). If verification succeeds, then at step s83, the CCI verifier module 15 verifies the second digital signature $\text{SigK}_M-1(S_c, A')$ using $S_p$, A' and $K_M$. If $S_p=S_c$, then this step verifies that the copied disk has not itself been copied, so preventing playback of second generation copies. If verification succeeds the playback device 17 plays back the data (s84), otherwise play back is prevented (s85).

It will be appreciated that the method according to the invention can be used in any general digital recording system where a unique or nearly unique identifier can be associated with a storage medium. This includes, for example, smart card RAM memories with some ROM memory for immutable storage of the identifier.

It will further be appreciated that although a scheme based on the public key algorithm has been described in detail, other means of implementing a digital signature are not excluded.

What is claimed is:

1. Apparatus for processing data stored on a storage medium, the medium having thereon:
   stored data,
   a medium identifier,
   stored verification information for the medium identifier; and
   stored copy control data;
   the verification information including a digital signature generated from the medium identifier, the apparatus including:
   authentication means for verifying the digital signature; and;
   processing control means operable to control the processing of the stored data:
     in dependence on the relationship between the medium identifier and the verification information, and
     in accordance with the copy control data stored on the medium.

2. Apparatus according to claim 1, wherein said processing control means comprises recording control means for controlling the recording of said data from said medium in response to said copy control data.

3. Apparatus according to claim 2, wherein the recording control means is operable to prevent recording of the data if the verification information for the medium identifier indicates that the medium is a copy of an original.

4. Apparatus according to claim 1, wherein the medium identifier is stored on a read-only part of the medium.

5. Apparatus according to claim 1, wherein the medium identifier comprises a first medium identifier and the verification information includes a second medium identifier.

6. Apparatus according to claim 5, wherein the processing control means is responsive to a comparison between the first medium identifier and the second medium identifier.

7. Apparatus according to claim 6, wherein the processing control means is operable to prevent playback of the data if the first and second medium identifiers are different.

8. Apparatus according to claim 1, wherein the copy control data is selected from a set of data which specifies that the medium can be copied freely, copied once or cannot be copied.

9. Apparatus according to claim 8, further comprising means for altering the copy control data for storage on to a recordable medium.

10. Apparatus according to claim 9, wherein said altering means is operable, in the event that said copy control data specifies that the medium can be copied once, to alter the copy control data to specify that said recordable medium cannot be copied.

11. Apparatus according to claim 1, comprising a DVD player.

12. Apparatus according to claim 11, wherein the medium comprises a DVD disk.

13. Data storage medium processing apparatus, said storage medium having thereon:
   stored data,
   a medium identifier,
   stored verification information for the medium identifier, and
   stored copy control data,
   the verification information including a digital signature generated from the medium identifier,
   said data storage medium processing apparatus comprising:
   authentication means for verifying the digital signature,
   a playback module operable to control playback of said stored data on in dependence on the relationship between the medium identifier and the verification information; and
   a recording module operable to control the recording of said data from said data storage medium on to a recordable storage medium in response to the copy control data.

14. A method of processing data stored on a storage medium the storage medium having thereon:
   stored data,
   a medium identifier,
   stored verification information for the identifier,
   stored copy control data, and
   the verification information including a digital signature generated from the medium identifier the method comprising:
   verifying the digital signature,
   controlling the processing of the stored data in dependence on the relationship between the medium identifier and the verification information, and
   controlling the recording of data from said medium in response to the copy control data.

15. Recording apparatus for recording data onto a data storage medium,
   the storage medium having a medium identifier,
   the recording apparatus comprising:
   means for producing verification information by generating a digital signature from the medium identifier, and
   means for controlling recording onto the storage medium in response to copy control data stored on a medium from which the data is being recorded, and
   means for storing said verification information on the medium.

16. Apparatus according to claim 15, wherein the verification information comprises the medium identifier.

17. A method of recording data from a first data storage medium onto a second data storage medium,
the first storage medium having thereon:
a first medium identifier,
verification information generated from the first medium identifier, and
stored copy control data which indicates that said data may be copied at least once,
the second medium having a second medium identifier, the method comprising the steps of:
verifying from the verification information that said first medium is an original medium;
producing verification information by generating a digital signature from said second medium-identifier; and
storing said verification information on said second medium.

18. A method according to claim 17, further comprising the step of storing copy control data on said second medium.

19. A method according to claim 18, further comprising the step of altering the copy control information read from the first medium for storage onto the second medium in accordance with the nature of the copy control data.

20. A method according to claim 19, comprising, in the event that the copy control data permits a single copy of an original to be made, altering the copy control data to indicate that no further copies can be made, and storing said altered copy control data onto the second medium.

21. A method according to claim 18, further comprising the step of digitally signing the copy control data.

22. A method as claimed in claim 17, in which the verification information stored on the first medium is digitally signed, the method further comprising verifying a digital signature of the verification information stored on the first medium.

23. A data storage medium comprising:

a medium identifier, verification information for the identifier stored on the medium, the verification information including a digital signature, and copy control data stored on the medium, the copy control data being for use in controlling the copying of data from the medium, the digital signature of the verification information being generated from the medium identifier.

* * * * *